Patented Sept. 13, 1932

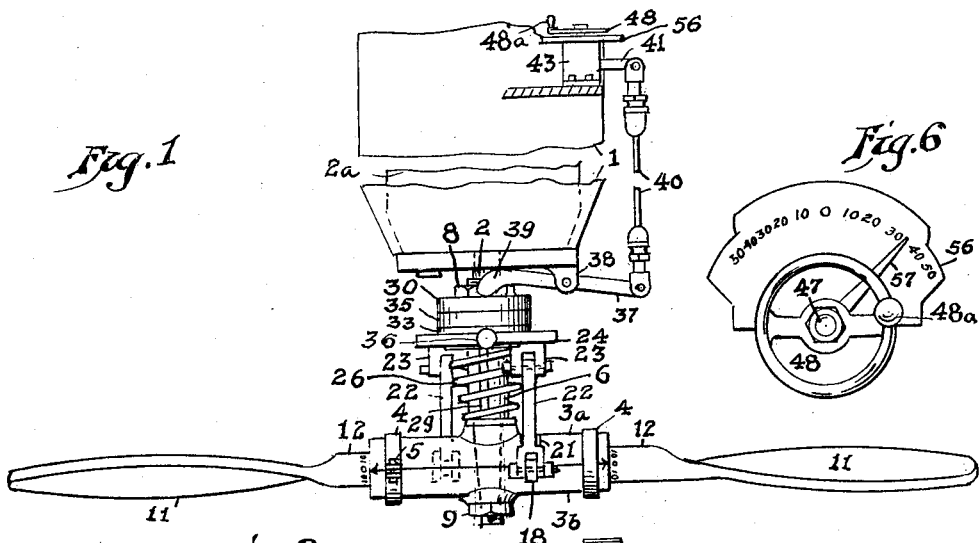

1,877,115

UNITED STATES PATENT OFFICE

JOHN RAPP ZIPAY, OF PITTSBURGH, PENNSYLVANIA

VARIABLE PITCH PROPELLER MECHANISM

Application filed September 26, 1929. Serial No. 395,261.

My invention is particularly designed and intended for use in connection with aeroplanes and the object in view is the provision of convenient and practical means whereby the operator may at will vary or adjust the pitch of the propeller blades while operating the aeroplane or other machine or when the same is on the ground or stationary.

By adjusting the pitch, either before starting or while the engine is running, to a less than normal angle the engine is allowed to pick up speed and deliver its maximum power, which is necessary in taking off with a heavier load than the same aeroplane could otherwise normally carry. Upon reaching the desired altitude the pitch may be increased by the pilot and the engine running at its most economical speed, still with the possibility of increased speed ranges should occasion demand. As the load is lightened by consumption of gasoline on a long distance flight, the pitch may be still further increased.

In landing the pitch of the screw may be changed to any degree or to the opposite direction or "reversed", just before the instant of contact with the ground, and the aeroplane brought to a stop in the very shortest space, thus entirely obviating the necessity of any prepared ground system of slowing up the aeroplane.

The aeroplane of today requires a considerable field area for rising and landing, and many designs of aeroplanes can effect a landing only at high speeds, which to a certain extent makes the operation of landing more hazardous than average flying. If convenient and practical operated variable pitch propellers were provided, the landing speeds could be reduced at least 50%.

Variable pitch propellers are also of great advantage in connection with the high altitude flying which is likely to become a feature of aerial transportation of the future. In such cases the value of the variable pitch propeller lies in the fact that the engine loses power with elevation because of the reduced ability to burn fuel. In other words, the engine at higher altitudes acts as if it were partially throttled.

A practical variable speed propeller will accomplish for aircraft substantially what change speed gears accomplish for the automobile.

My invention lies in the new and improved mounting of the propeller blades on the propeller shaft and the means under the control of the operator for setting and varying at will the pitch of the blades.

Other novel features of construction, and also of arrangement of parts, will appear from the following description.

In the accompanying drawing, wherein I have illustrated a practical embodiment of the principles of my invention, Fig. 1 is a plan view showing the propeller blades of an aeroplane and their mounting and the mechanism for setting and varying the pitch of the blades, the fuselage of the aeroplane being shown in part.

Fig. 2 is a front elevation on enlarged scale with the front part of the propeller-bushing removed and the stems of the propeller blades shown in section.

Fig. 3 is an enlarged detail partially in section.

Fig. 4 is an enlarged plan view of the controller also shown on smaller scale in Fig. 1.

Fig. 5 is a sectional view of the same taken along the line 5—5 in Fig. 4.

Fig. 6 is an elevation of the controller looking downwardly in Figs. 1 and 4.

Referring to the drawing, 1 represents the front portion of the fuselage of an aeroplane, and 2 the propeller shaft which is driven in the usual manner as by the motor 2a which is mounted in the fuselage. The propeller shaft extends forwardly from the fuselage and has mounted on its outer or front end the partible and transversely disposed propeller bushing.

The bushing comprises two parts 3a and 3b, the plane of parting being at right angles to the propeller shaft and the parts being detachably but rigidly held together, as by the clamping bands 4 which are tightened by means of the bolts 5.

The bushing 3a is provided with a rearwardly extending tubular neck 6 which fits over the shaft 2 and is held to rotate therewith as by means of the feathers 7. The central or non-cavitated portions of the bushing parts are provided with registering holes to receive the shaft and the bushing is held fixedly on the shaft by the taper of the latter and the nut or nuts 9 screwed on the front end of the shaft against the bushing. The nuts may be provided with suitable devices to prevent them from loosening.

On either side of their central portions the bushing parts are cavitated to form when the parts are assembled cylindrical bores into which the stems 10 of the propeller blades 11 extend. The blades are provided with enlarged cylindrical collar portions 12 whose inner ends form circumferential shoulders which limit the extension of the stems into the bushing, and also at the inner side of the collars 12 with smaller collars 12a which occupy enlarged portions of the bushing bores.

The bores are provided with the spaced apart circumferential grooves 13 and 14, the grooves 13 being located in registration with the clamping rings 4 when the latter are in place.

The grooves 13 and 14 receive the outer raceway members of the ball or other anti-friction bearings 15. The inner raceways of such bearings are fixed in proper position and spaced relation on the stems 10. Thus the raceway of the outer bearing on a stem fits against the shoulder 12a of the stem. The raceways are properly spaced apart on a stem as by the collar 16 which is fixed on the stem as by shrinking, or a set screw, as shown, may be used. The inner raceway is held in position as by a nut 17 screwed up against it on a threaded portion of the stem. The nut may be held against accidental loosening as by the lock-washer 17a.

The partings of the raceways are such, as shown in Fig. 2, that the bearings act as thrust bearings to prevent longitudinal movement of the blades and their stems relative to the bushing.

The inner ends of the stems are tapered to fit in the tapered bores of the hubs of the pitch-cranks 18, and nuts 19 are screwed on the threaded ends of the stems to hold the pitch-cranks on the stems. The cranks are held against rotary movement relative to the stems, as by the keys 20, and the nuts 19 are held against loosening, as by the lock-washer 19a.

The two pitch-cranks are arranged to extend in diametrically opposite directions and protrude outwardly through circumferentially disposed slots 21 cut in the walls of the bushing parts.

It is evident that by properly moving the cranks, the pitch of the propeller blades may be varied.

Links 22 are pivotally connected at their one end to the outer ends of the pitch-cranks, and the other ends of said links are pivotally connected to the yoke members 23 fixed on the front of the head 24 of a sleeve 25 slidably mounted on the neck 6.

The yoke members 23 are diametrically opposite the axis of the sleeve 25 but the axes of pivotal connection of the links thereto are disposed in parallel planes which are tangential to a circle described from the axis of the sleeve, as shown in Fig. 1.

The sleeve 25 is resiliently pressed rearward or toward the fuselage, as by the spiral spring 26 which encircles the neck 6 with its front end bearing against the bushing and its rear end seated in a sunken groove 27 on the front end of the sleeve.

The bore of the sleeve has fixed thereon the brass bushing 28 and said bushing is provided with a key-way which is engaged by the feather 29 on the neck 6. Thus the sleeve is caused to rotate with the shaft but is slidable longitudinally thereof.

30 represents an annular thrust disk into the bore of which is fixed the brass bushing 31 which encircles the rearwardly extending hub or reduced portion 32 of the sleeve. On the inner end of the bushing 31 is mounted the inner raceway of an anti-friction bearing 33 whose outer raceway is seated in the recess formed by an annular shoulder 34 which is formed on the rear of the head 24 of the sleeve 25. The bearing is provided with a dust ring 35.

The extent of rearward movement of the sleeve 25 on the neck 6 is limited and may be regulated by any suitable means, as by a nut or nuts 8 which are screwed on a threaded portion of the neck. 36 represents an oil cup.

37 represents a thrust lever pivotally mounted intermediate of its end, as at 38, on the front of the motor. One end of the lever is forked to straddle the shaft 2 and has rounded terminals 39 which bear against the thrust disk 30 while the other end of the lever is connected, as by the wire cable or other linkage 40, with one end of a lever 41 whose other end is pivotally connected as by the bolt 42 to a housing 43 which is mounted on a portion of the fuselage convenient to the hand of the operator in the cockpit.

Intermediate of its length the lever 41 is provided with a box 44 in which the nut 45 is mounted so as to turn on an axis parallel with the axis upon which the lever 41 may be swung. Thus the nut may be provided with trunnion pins 46 which are journaled in bearing slots in the upper and lower walls of the box, said slots being arcuate relative to the bolt 42 to prevent binding. 46a represents washers interposed between the nut and the walls of the box.

The nut 45 is screwed on a threaded shaft 47 which is journaled in the housing 43, one end of the shaft protruding and being provided with a hand wheel 48 provided with a crank handle 48a. The extent of travel of the nut toward the crank end of the shaft is adjustably limited by means of a collar 49 which may be fixed at the desired position on the shaft as by means of a set screw. The threads of the nut and shaft are "squared" so that the nut is self-locking on the shaft to prevent its accidental movement.

50 represents a rack bar mounted to slide in the housing 43 in a plane at right angles to the axis of the shaft 47, and said shaft is provided with a pinion 51 which meshes with the rack bar so that said rack bar may be shifted by rotating the shaft. The inner end of the lever 41 is provided with a rigidly attached arm 52 whose other end is provided with a notch which engages a pin 53 on the rack bar 50 so that the lever is swung in response to the movement of the rack bar.

The rack bar 50 is held against jumping relative to the housing 43 and in proper position and alinement to insure proper meshing with the gear 51, as by the bolts 54 whose heads engage the rack bar from beneath and which are screwed into threaded holes in the housing. The bolts are provided with lock nuts 55 to hold them in their adjusted position.

The housing 43 is provided at its rear end with a dial plate 56 which is graduated in opposite directions from zero and in relation to which a pointer 57, carried by the shaft 47, moves.

A spring 58 holds the forked end of the lever 37 in resilient contact with the thrust disk 30.

It is obvious that the operator or mechanism may adjust the pitch of the propeller blades to suit the circumstances of flight and such adjustment may be made either while the aeroplane is in the air or on the ground.

To enable the control mechanism in the cockpit and its connections to be accurately adjusted, the collars 12 on the propeller blades are marked with graduations similar in character and arrangement to those of the dial 54 and which are readable relative to an arrow or other mark on the end portions of the propeller bushing.

Thus readings on the dial 54 may be checked up with those on the propeller blades.

As already stated, the threads of the nut 45 and the shaft 47 are "squared" or substantially rectangular in cross-section so that the nut is held against accidentally shifting on the shaft. This method of locking the pitch-control against accidental variation permits the finest and most accurate adjustment, an accuracy unattainable if a locking quadrant and pawl or similar locking means were employed.

It is apparent that when the pointer 57 is moved clockwise in Fig. 6, the sleeve 25 is moved forwardly along the shaft 2 toward the propeller bushing, compressing the spring 26 while a reverse movement of the pointer permits the spring to expand causing a retreat of the collar, the limit of said retreat being determined by the nut 36.

It is evident that the motor, the propellers and the variable pitch control may be installed in or removed from an aeroplane as a unit.

The parting of the propeller bushing in a plane at right angles to the propeller shaft provides a stiffer and more rigid bushing structure, the forces due to the rapid revolution of the shaft having no tendency to thrust the bushing parts away from each other. Again the means for securing the bushing to the shaft act also to clamp the bushing parts rigidly together.

What I desire to claim is:—

1. The combination with a tubular support, of a shaft carrying said support, alined bearings adjacent opposite ends of and within said tubular support, a pair of shafts each mounted in the bearings at a respective end of said support, arms keyed to the inner ends of said pair of shafts and projecting in opposite directions from respective shafts of the pair, said support being slotted and the arms projecting through the slots, a disk splined on the first mentioned shaft for movement longitudinally thereof, ears on said disk, links each pivoted at one end to the projecting end of an arm and at its other end to a respective ear, a spring interposed between said disk and support, an antifriction bearing carried by said disk on the side remote from the support, a second disk mounted revolubly on the first disk and bearing against said antifriction bearing, and a forked lever pivoted adjacent said second disk and bearing at the forked end thereagainst.

2. The combination with a tubular support, of a shaft carrying said support, alined bearings adjacent opposite ends of and within said tubular support, a pair of shafts each mounted in the bearings at a respective end of said support, arms keyed to the inner ends of said pair of shafts and projecting in opposite directions from respective shafts of the pair, said support being slotted and the arms projecting through the slots, a disk splined on the first mentioned shaft for movement longitudinally thereof, ears on said disk, links each pivoted at one end to the projecting end of an arm and at its other end to a respective ear, a spring interposed between said disk and support, an antifriction bearing carried by said disk on the side remote from the support, a second disk mounted revolubly on the first disk and bearing against said antifriction bearing, a bell crank pivoted in spaced relation to the pivot of the forked lever, a link connecting one arm of the bell crank with the forked lever, a rack having the remaining arm of the bell crank connected thereto, a gear meshing with said rack, and means to rotate said gear.

Signed at Pittsburgh, Pa., this 18th day of September, 1929.

JOHN RAPP ZIPAY.